(12) United States Patent
Nimberger et al.

(10) Patent No.: US 9,206,922 B2
(45) Date of Patent: Dec. 8, 2015

(54) REMOTELY OPERATED SHUTOFF VALVE

(75) Inventors: Spencer M. Nimberger, Houston, TX (US); Miguel Gonzalez, Houston, TX (US)

(73) Assignee: PGI INTERNATIONAL, LTD., Houston, TX (US)

( * ) Notice: Subject to any disclaimer, the term of this patent is extended or adjusted under 35 U.S.C. 154(b) by 598 days.

(21) Appl. No.: 13/442,416

(22) Filed: Apr. 9, 2012

(65) Prior Publication Data
US 2013/0264504 A1  Oct. 10, 2013

(51) Int. Cl.
*F16K 31/11*   (2006.01)
*F16K 31/10*   (2006.01)
*F16K 31/56*   (2006.01)
*F16K 1/20*    (2006.01)

(52) U.S. Cl.
CPC ............ *F16K 31/105* (2013.01); *F16K 1/2007* (2013.01); *F16K 31/563* (2013.01)

(58) Field of Classification Search
USPC ........... 251/66, 68, 69, 89, 90, 111, 113, 301, 251/129.04
See application file for complete search history.

(56) References Cited

U.S. PATENT DOCUMENTS

| | | | | |
|---|---|---|---|---|
| 1,620,876 A | * | 3/1927 | Currivan | 137/76 |
| 2,035,711 A | * | 3/1936 | Lowndes | 251/69 |
| 2,181,523 A | * | 11/1939 | Shiels | 137/76 |
| 2,354,704 A | * | 8/1944 | Ray | 335/238 |
| 2,358,999 A | * | 9/1944 | Ray | 335/251 |
| 2,570,593 A | * | 10/1951 | Ray | 74/104 |
| 2,653,622 A | * | 9/1953 | Ray | 137/66 |
| 2,700,393 A | * | 1/1955 | Ray | 137/66 |
| 2,712,429 A | * | 7/1955 | Ray | 251/129.03 |
| 2,924,235 A | * | 2/1960 | Knudsen | 137/461 |
| 2,925,988 A | * | 2/1960 | Ray | 251/68 |
| 3,027,132 A | * | 3/1962 | Smith | 251/54 |
| 4,475,565 A | * | 10/1984 | Keller et al. | 137/39 |
| 7,036,441 B2 | | 5/2006 | Scudder | |
| 7,401,562 B2 | | 7/2008 | Nimberger | |

* cited by examiner

*Primary Examiner* — John K Fristoe, Jr.
*Assistant Examiner* — Jonathan Waddy
(74) *Attorney, Agent, or Firm* — Renner, Otto, Boisselle & Sklar, LLP (57) ABSTRACT

A remotely operated safety valve is provided for terminating flow through the valve. The safety valve includes an electromagnet for holding the safety valve open, and a swing plate for closing the safety valve. A power supply is provided for powering the electromagnet, and an electrical conductor extends between the shutdown switch, the power supply, and the electromagnet. A connector spaced along the conductor is separable during a separation of a towing vehicle from the towed vehicle. The safety valve automatically closes in response to one of activation of the shutdown switch or the termination of power to the electromagnet.

20 Claims, 11 Drawing Sheets

REMOTELY OPERATED SHUTOFF VALVE

FIELD OF THE INVENTION

The present invention relates to emergency shutoff valves and, more particularly, to remotely actuated manually reset shutoff valves which provide essentially no flow restriction when open.

BACKGROUND OF THE INVENTION

Various types of shutoff valves have been proposed, including the valve disclosed in U.S. Pat. No. 7,036,441. The valve disclosed in this patent allows an operator to close the valve manually in the event of an emergency by pulling on a cable routed in close proximity of the operator, or automatically shuts the valve if the cable, which is typically attached to a vehicle towing the implement carrying the valve, is pulled by virtue of the towing and towed vehicle becoming disconnected or un-hitched. The '441 patent uses a spring loaded ball valve for closure which, when open, provides very little restriction to flow. The closure system uses a cable attached to a pin that releases the spring loaded ball valve when pulled. The cable, however, is difficult to adapt for both automatic and manual closure of the valve. This is because a cable routed for good automatic operation cannot easily be routed to the towing vehicle cab for operator manual operation. Similarly, a cable routed for good operator manual operation cannot be routed for proper automatic operation in the case of a vehicle un-hitch event. In addition, when the valve is left open for long periods, sticking associated with spring loaded ball valves becomes a problem affecting the reliability of the system.

The cable constraints and sticking ball valve issues of the '441 patent are overcome by the electrical release system disclosed in Nimberger U.S. Pat. No. 7,401,562 which discloses a poppet style valve. The poppet style shutoff valve, however, undesirably introduces significant flow restriction when the valve is open.

The disadvantages of the prior art are overcome by the present invention, an improved remotely operated shutoff valve is hereinafter disclosed.

SUMMARY OF THE INVENTION

A disk style shutoff valve eliminates significant flow restrictions when open, and resolves the sticking problems associated with spring loaded ball valves. Several embodiments of electrically operated mechanisms are disclosed that provide both "hold open" and release functionality.

The shutoff valve uses a swing style check disk held in the open position by an actuation pin situated close to the pivot point of the disk, such that a relatively small linear movement of the actuation pin will swing the disk from a closed position through approximately 90 degrees to an open position, and will hold the disk in the open position until the linear force on the actuation pin is removed. Several embodiments for sustaining and removing the linear force on the actuation pin are disclosed.

One embodiment utilizes a "U" shaped member that allows manual opening of the valve. When open, an electromagnet captures one end of the "U" shaped member, keeping the valve open until power is removed from the electromagnet which allows the spring biased "U" shaped member to release the actuation pin and close the valve.

Another embodiment involves a slightly different concept wherein the actuation pin that opens the valve is manually pushed to an open position without being connected to the release mechanism. With the disk in the open position, a constraint pin is inserted in a hole formed in the disk member by activation of an electric solenoid. The constraint pin holds the disk open until the solenoid power is removed. The spring biased constraint pin retracts from the hole in the disk and allows the valve to close.

Still another embodiment opens the valve manually by pushing on the actuation pin, as in the above embodiment. Once open, the disk is then held open by an energized electromagnet which comes into contact with the disk in the open position. An integrated proximity sensor provides open/closed status information and the disk can be released by dropping power to the electromagnet.

A feature of these embodiments is the combination of electrical hold open and release functionality with a valve that has essentially no flow restriction when open and no closure sticking tendencies when actuated. Another feature is the electrical feedback provided to indicate if the valve is latched open or not.

These and further features and advantages of the present invention will become apparent from the following detailed description, wherein reference is made to the figures in the accompanying drawings.

DETAILED DESCRIPTION OF PREFERRED EMBODIMENTS

Figure 1:
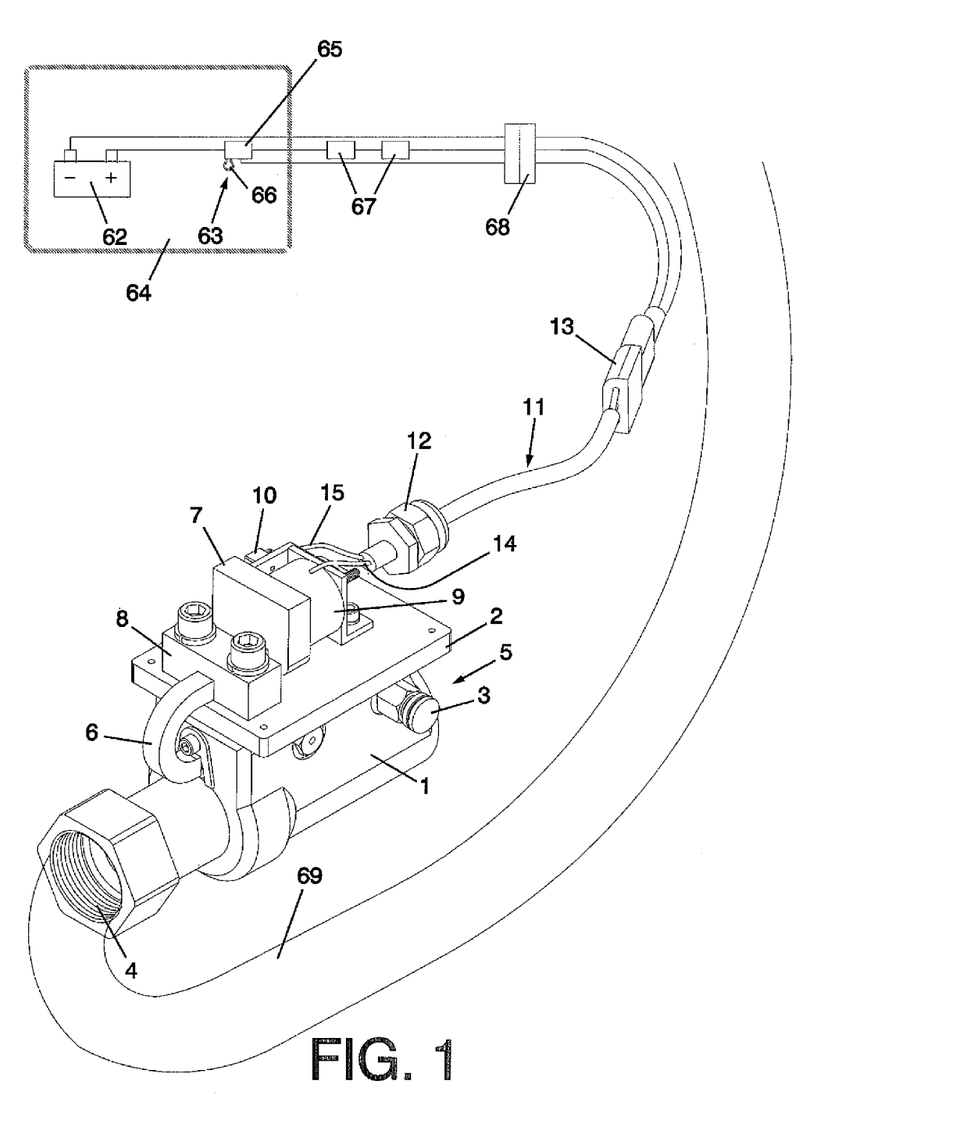
FIG. 1 is an isometric view of a preferred embodiment of a shutoff valve with the cover removed.

FIG. 1 is an isometric view of an emergency shutoff valve with the actuator compartment cover removed and ancillary system components. The valve includes a valve body 1, actuator compartment base 2, pressure bleed fitting 3, product outlet port 4 and product inlet port 5. The actuator assembly is composed of "U" shaped member 6 which is connected to actuator hold plate 7 and restrained by guide member 8, each fixed relative to the valve body 1. The electrical components consist of electromagnet 9, latch indicator relay 10, and electrical harness 11 which contains cover penetration cable restraint 12, connector 13, power wire 14 and relay wire 15. The ancillary electrical components are battery power source 62 and primary manual kill switch 63 both of which are typically located on a towing vehicle 64. Primary kill switch 63 contains the kill actuator 65 and the latched indicator light 66. Extending from the towing vehicle, the electrical circuit may contain one or more manual kill actuators 67 in addition to a pull-to-disconnect connector 68. Flow outlet line 69 generally follows the electrical harness to supply product some device located on the towing vehicle 64.

Figure 2:
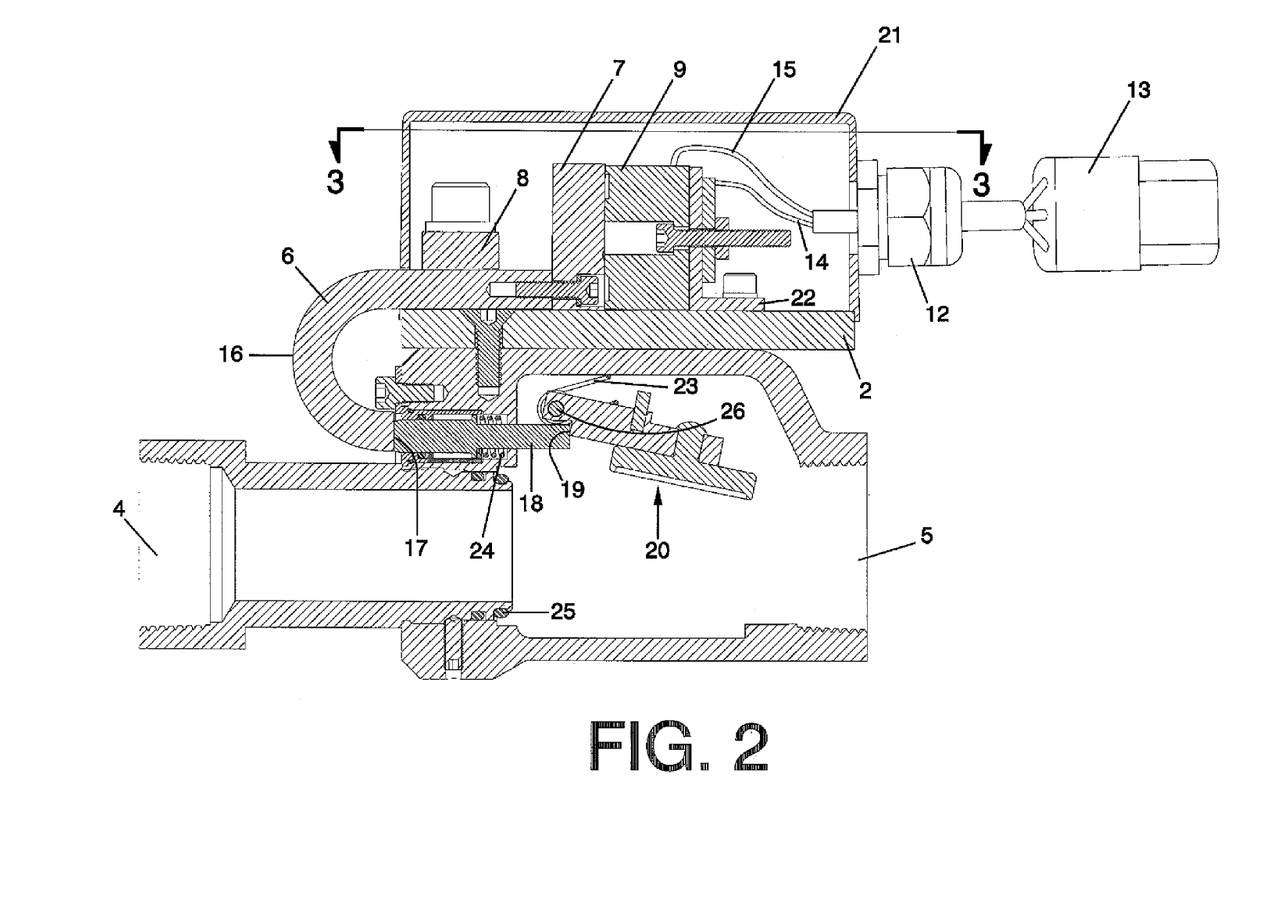
FIG. 2 is a side cross-sectional view of FIG. 1.

FIG. 2 is a side cross-sectional view of FIG. 1. The valve is opened by applying manual force to the surface 16 of actuator member 6. End 17 of member 6 moves actuation pin 18 to engage surface 19 of disk assembly 20, which swings the disk assembly to the open position. Surface 19 of disk assembly 20 and thus pin 18 are located very close to the pivot point 26 of disk assembly 20, such that a relatively small linear movement of actuation pin 18 will move the disk assembly from full closed to full open. The other end of member 6 is attached to hold plate 7 which is brought into contact with electromagnet 9, which holds the valve open when the electromagnet is energized. The latching mechanism is protected from the elements by cover 21. The electromagnet is attached to the base plate 2 by bracket 22. With the electromagnet energized and the valve in the open position, fluid is free to flow in an unobstructed manner from inlet port 5 to outlet port 4.

Figure 3:
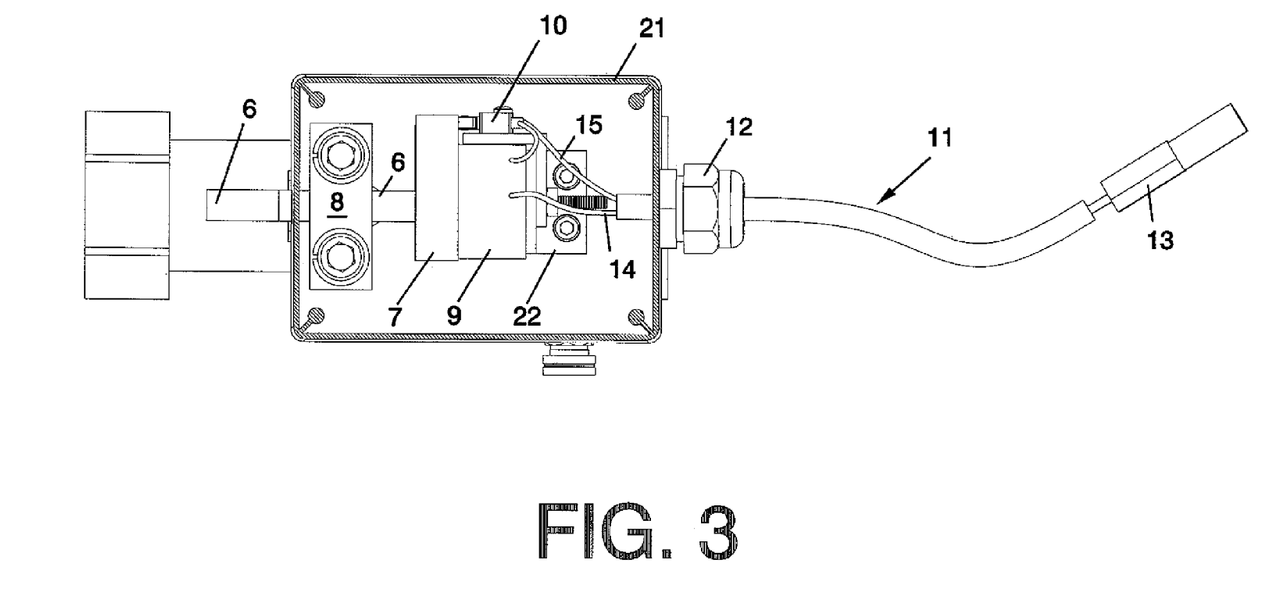
FIG. 3 is a top cross-sectional view of FIG. 1 through section 2-2 of FIG. 2.

FIG. 3 is a top view of FIG. 1 showing the position of latching indicator relay 10 which is closed electrically when plate 7 is contacting electromagnet 9. This latching relay is connected via the wiring harness 11 to one or more electrical actuation points 63 and 67 where the closed latching relay is used to light a latching indicator light 66 and where power to the electromagnet can be interrupted, causing the valve to close.

The electrical harness can also be arranged between a towing and towed vehicle such that if a towing disconnection occurs between the two vehicles, the electrical harness will pull apart at a connection point 68 which will disconnect the electromagnet from the power source, typically the battery 62 of the towing vehicle. This will de-energize the electromagnet, allowing the valve to swing to a closed position thus achieving "automatic" closure in the un-hitching situation. The closing force is provided by disk biasing spring 23 and pin 18 biasing spring 24 when the electromagnet power is removed. Once the disk assembly 20 is partially closed, the flow of product through the valve will move it to its fully closed position against resilient seat ring 25.

Figure 4:
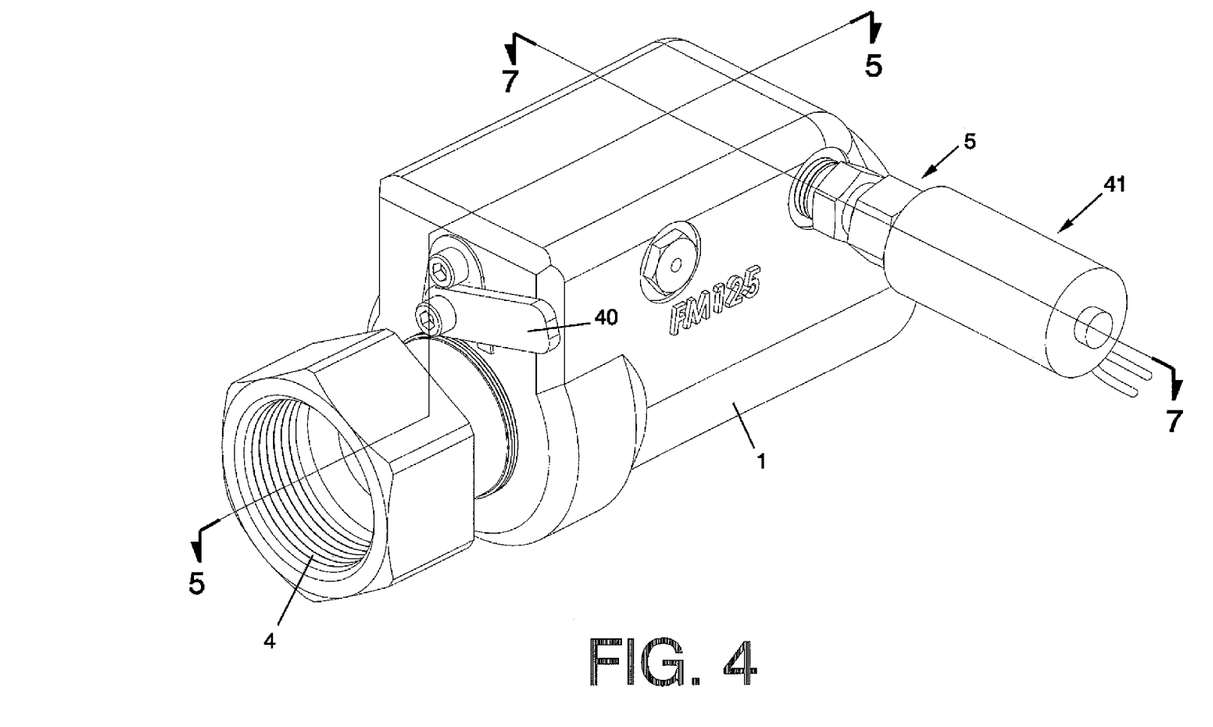
FIG. 4 is an isometric view of another embodiment.

FIG. 4 is an isometric view of another embodiment. The body 1, inlet port 5 and outlet port 4 are identical to the previous embodiments. The valve is opened by manually pressing on push tab 40 which is fixed to the end of actuation pin 18. Once the valve is opened manually, solenoid assembly 41 is actuated to hold the valve in the open position.

Figure 5:
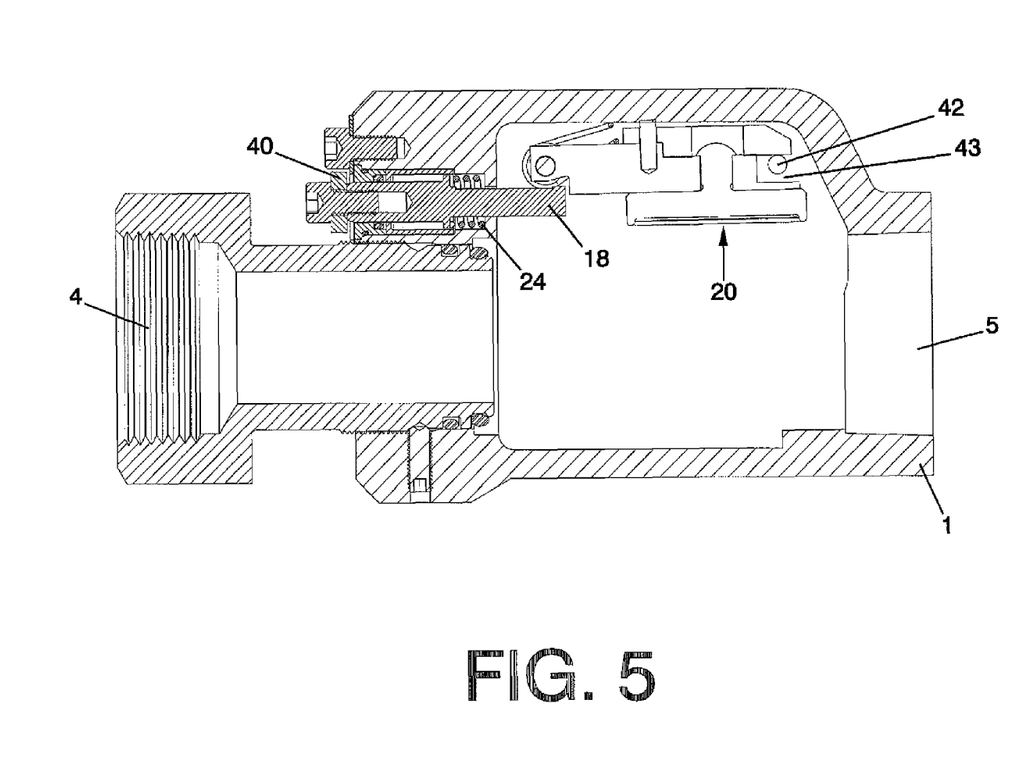
FIG. 5 is a cross-sectional view of FIG. 4 through section 5-5 with the valve open.
Figure 6:
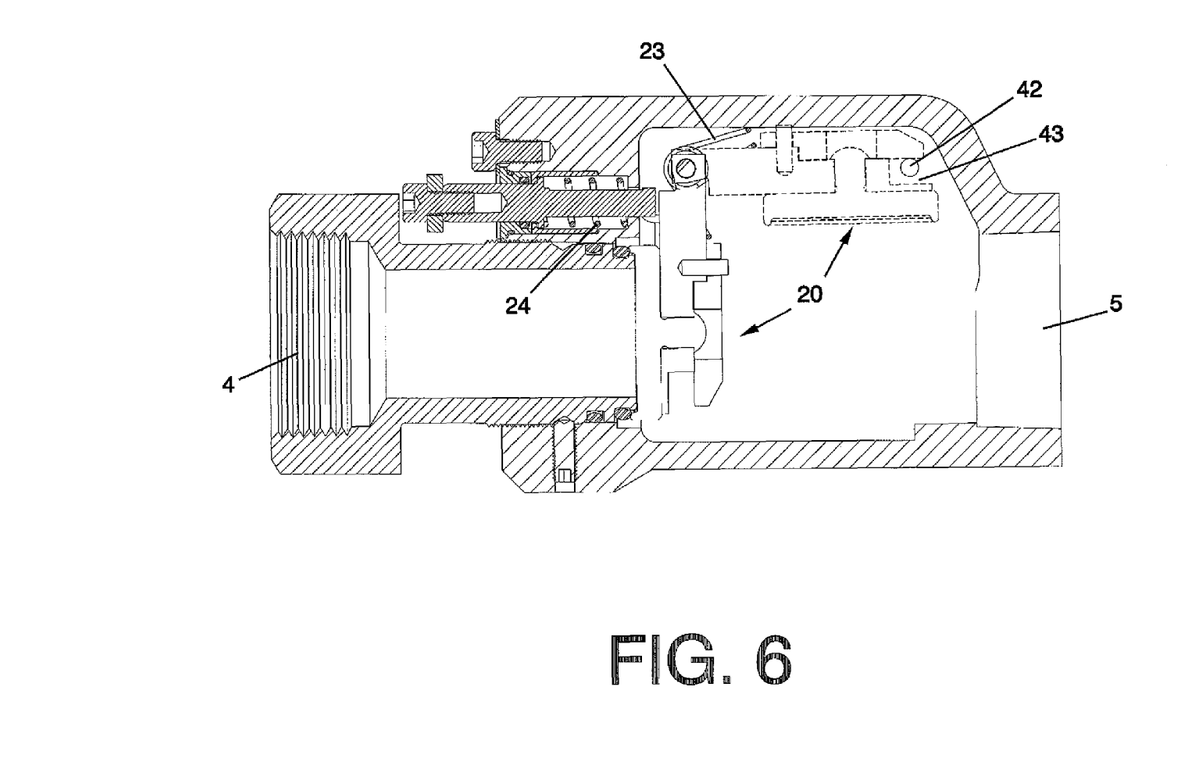
FIG. 6 is a cross-sectional view of FIG. 4 through section 5-5 with the valve closed, and showing the open position in dashed lines.

FIG. 5 is a cross-sectional view of FIG. 4. With actuation pin 18 in the open position, the solenoid assembly 41 is energized which extends hold pin 42 into cavity 43 on disk assembly 20 such that when force is removed from push tab 40, the actuator pin biasing spring 24 moves the pin 18 to the spring bias position clear of engagement with disk assembly 20, and keeping the solenoid assembly 41 energized such that the disk assembly 20 will be held open by hold pin 42. When the solenoid 41 is de-energized, hold pin 42 will withdraw from cavity 43 on disk assembly 20, allowing the disk assembly 20 to move to its closed position assisted by product flow and the disk bias spring 23, as shown in FIG. 6. The open position of the disk assembly 20 is shown in dashed lines in FIG. 6.

Figure 7:
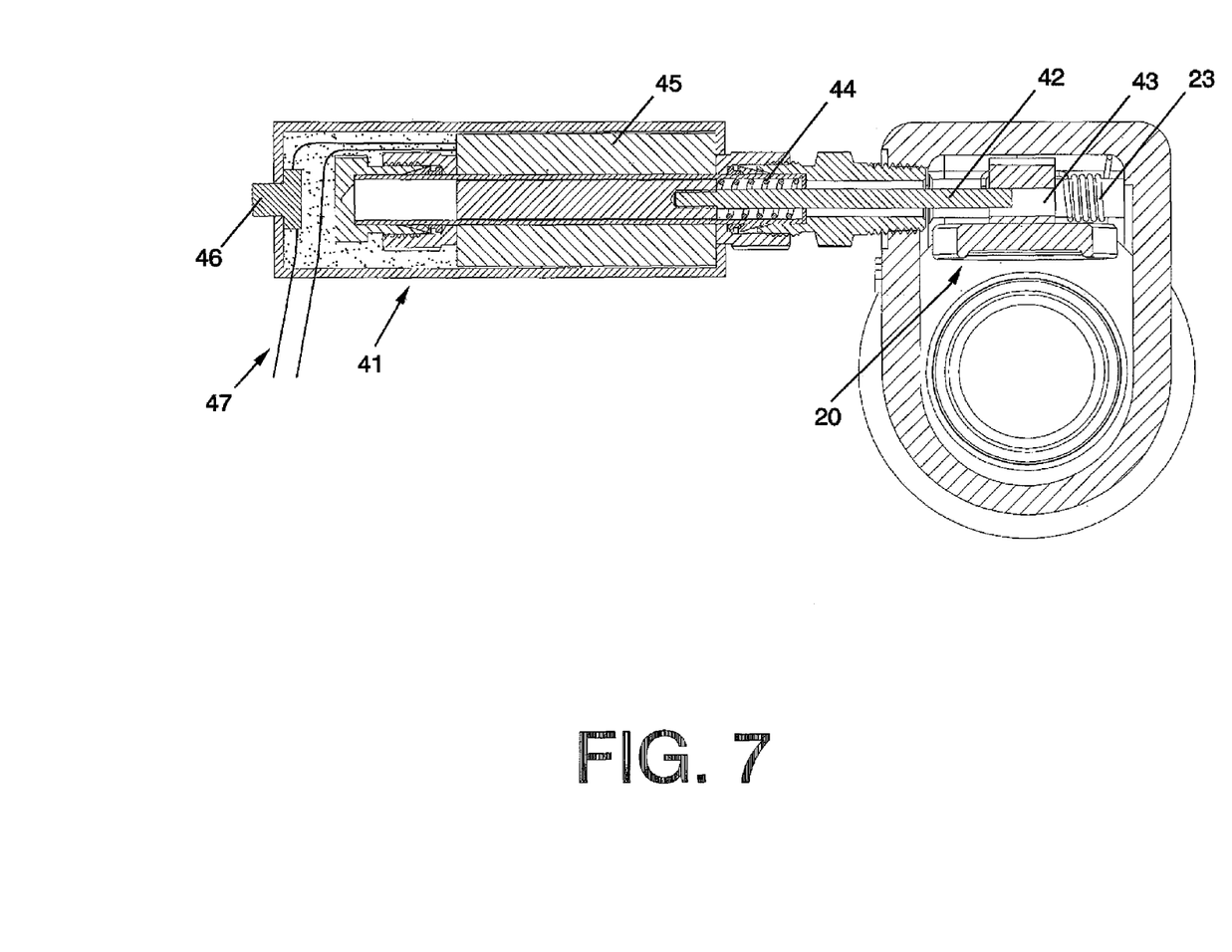
FIG. 7 is a cross-sectional view of FIG. 4 through section 7-7 with the valve closed.
Figure 8:
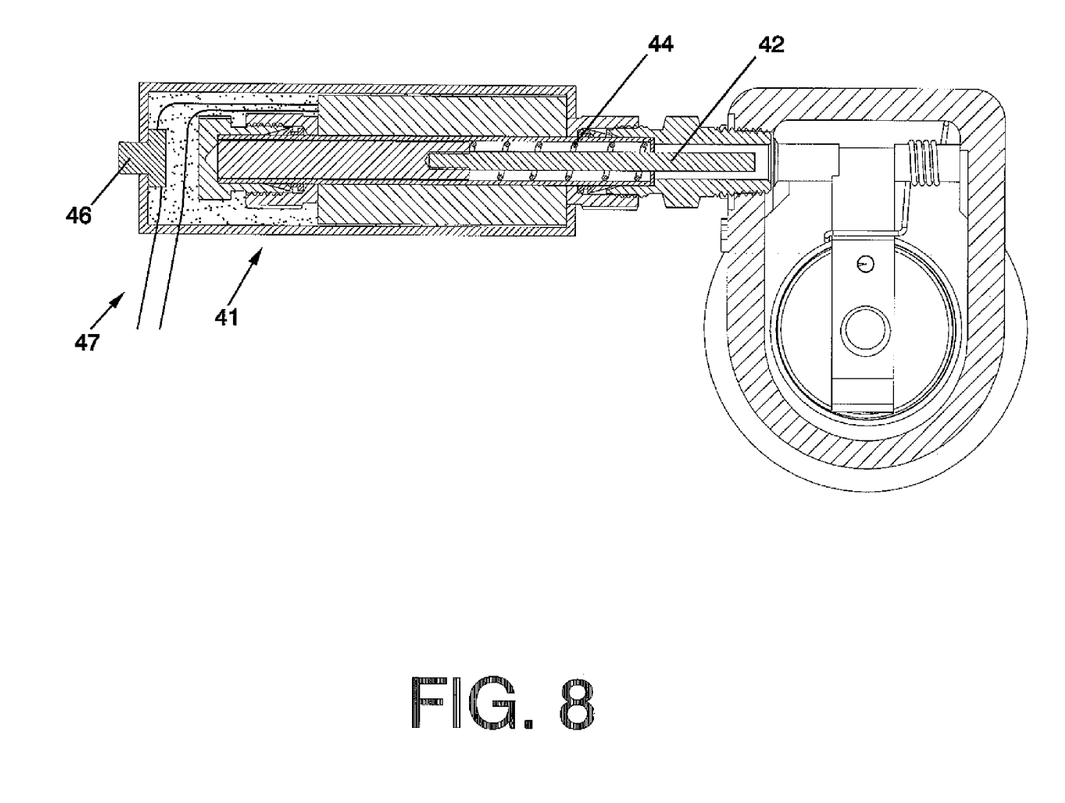
FIG. 8 is a cross-sectional view of FIG. 4 through section 7-7 with the valve open.

FIG. 7 is a cross sectional view of solenoid assembly 41. When electromagnet 45 is energized, hold pin 42 is moved to its extended position as shown in FIG. 7 which also compresses return spring 44. When power is removed from electromagnet 45, hold pin return spring 44 forces hold pin 42 to its retracted position, allowing disk assembly 20 to close, as shown in FIG. 8. Momentary open button 46 located on solenoid assembly 41 is provided to interrupt the power to the solenoid when depressed to retract hold pin 42, while push tab 40 is used to move the disk assembly 20 to its open position. While disk assembly 20 is held open, momentary open button 46 is released which closes the power circuit in power harness 47. The energized electromagnet 45 moves hold pin 42 into cavity 43 to hold the disk assembly 20 in the open position. If power is then interrupted in harness 47 by vehicle separation, the valve will automatically close.

Figure 9:
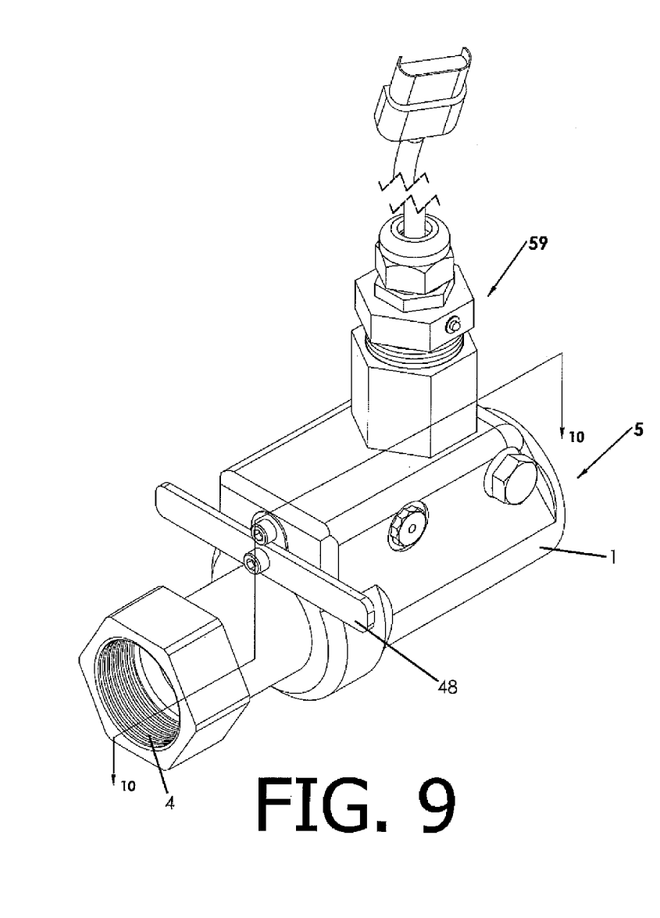
FIG. 9 is an isometric view of another embodiment.
Figure 10:
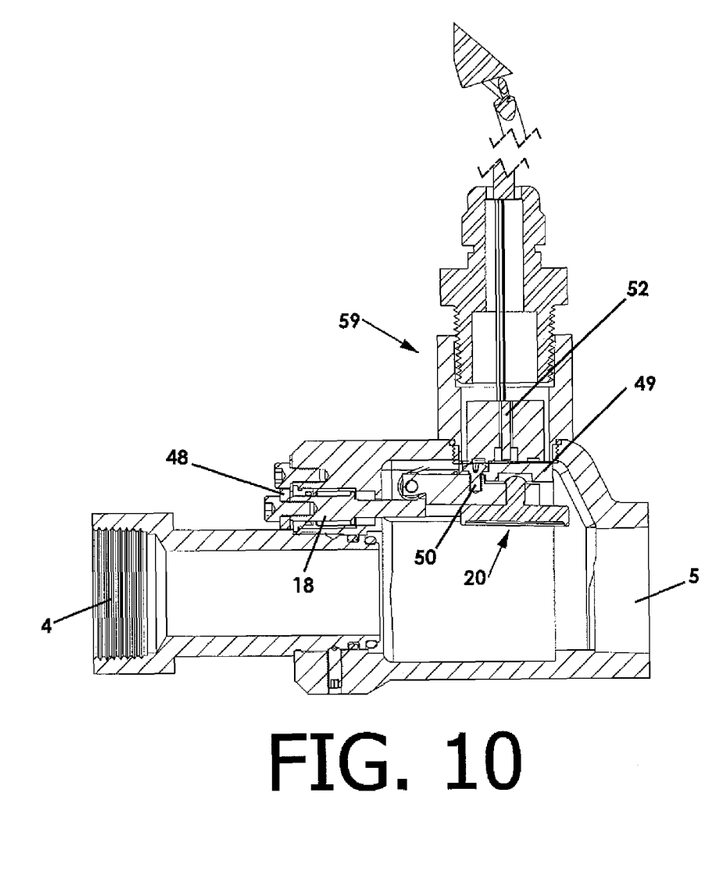
FIG. 10 is a cross-sectional view of FIG. 9 through section 10-10 with the valve open.
Figure 11:
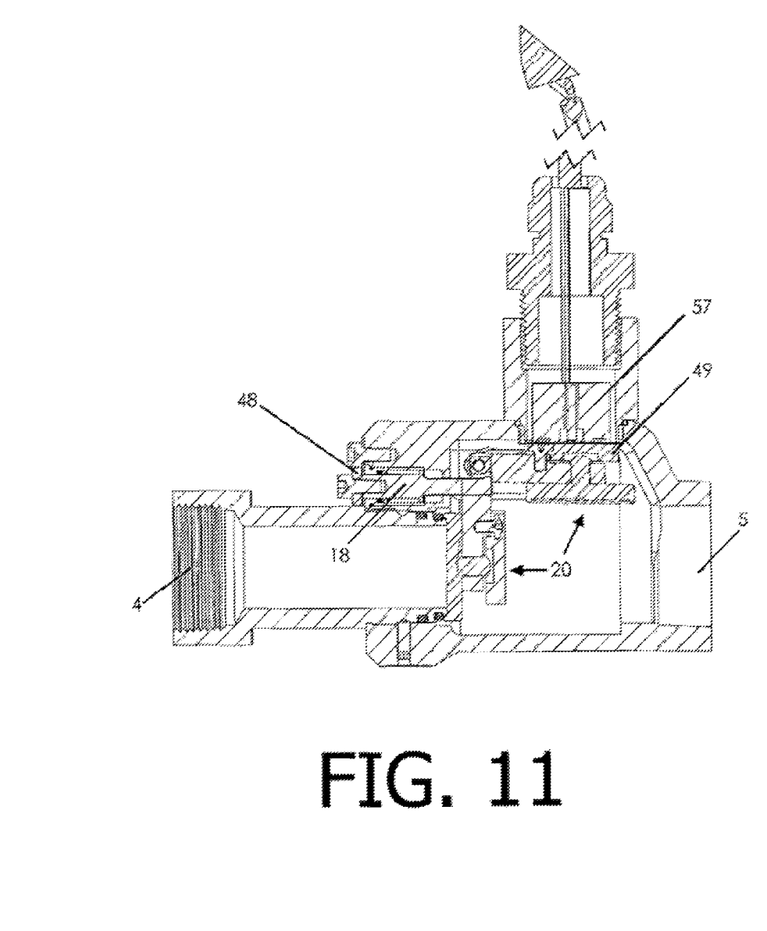
FIG. 11 is a cross-section view of FIG. 9 through section 10-10, showing the position of the swing disk in both the open and closed positions, and showing the valve open position in dashed lines.

FIG. 9 is an isometric view of another embodiment. The body 1, inlet port 5 and outlet port 4 may be identical to the previous embodiments. The valve is opened by manually pressing on push tab 48 which is fixed to the end of actuation pin 18. Once the valve is opened manually, electromagnet assembly 49, which penetrates and is mounted to body 1, is actuated to hold the valve in the open position. Disk assembly 20, similar the previous embodiments, is modified slightly to include magnetic catch plate 49 attached to disk assembly 20 by screw 50. The catch plate provides a surface highly permeable to magnetic flux such that when electromagnet 51 is energized, the catch plate 49 is held firmly to the face of electromagnet 51. Proximity sensor 52 is integral to the electromagnet assembly 59 and allows the close proximity of the latch plate 49 to be detected and used to illuminate a "latched open" light 66 at any point along the power circuit. When power is removed from electromagnet 51, the magnetic latch plate 49 is released allowing the disk assembly 20 to move to the closed position as shown in FIG. 11.

The advantages of moving the drive pin linearly to hold the swing plate open are twofold:
(1) The linear push on the pin does not involve a wear point as is the case with a cam, and
(2) The required movement of the hold-open device for pushing the pin is much less than that required to rotate the cam through at least 45 degrees. In the direct push method, the actuator latch plate moves the same amount as the drive pin. In the cam situation, the latch plate moves considerably farther as it swings and requires more space, and therefore cost, to accommodate the swing motion.

Another embodiment for sustaining and removing the linear force on the actuation pin utilizes a cam shaped member affixed to a rotatable shaft. The shaft is manually rotated to apply linear force on the actuation pin and open the valve. A second member affixed to the shaft is captured by an electromagnet in the full open position and holds the valve open until power is removed from the electromagnet, thereby allowing the spring biased shaft to rotate and thereby remove force from the actuation pin and allow the valve to close. A cam shaped member may be rotated about cam shaft to apply linear force on actuator pin to open the disk assembly. The valve may be opened by manually rotating the cam shaft against the biasing spring. The cam shaft is fixed to magnetic latching assembly composed of a holding member attached to arm. When holding member is manually rotated into contact with electromagnet, the valve will remain open until power is removed from electromagnet, allowing the biasing spring to rotate the cam member out of engagement with actuation pin, thereby allowing the disk assembly to swing to the closed position. The position of handle visually indicates the open or closed condition of the valve and an indicator relay may be used to contact the arm in the open position to electrically indicate the relay open or closed condition throughout the system.

A feature of the emergency shutoff valve is the fail safe nature of the release mechanism. The valve closes on loss of power. A related feature is the ability of the release circuit to easily be adapted for automatic or multipoint manual activation. The spring biased actuation pin is located such that a small linear movement of the actuation pin may fully open the valve Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A remotely operated shutoff valve system, comprising:
a safety valve for selectively terminating flow through the safety valve, the safety valve including an electromagnet for holding the safety valve open, and a swing plate for closing the safety valve while providing a low restriction to fluid flow when the safety valve is open;
an electrical power supply for powering the electromagnet;
a shutdown switch;
an electrical conductor extending between the shutdown switch, the power supply, and the electromagnet, the electrical conductor including an electrical connector spaced along the electrical conductor, and a flow line between a towing vehicle and a towed vehicle being separable during a separation of the towing vehicle from the towed vehicle, the safety valve being positioned along the flow line; and
the safety valve automatically closing in response to one of activation of the shutdown switch or the loss of electrical power to the electromagnet,
wherein the safety valve includes a linearly movable member, such that the electromagnet is adjacent one end of the linearly movable member and a linearly movable pin for holding the swing plate open is adjacent the other end of the linearly movable member,
wherein the linearly movable member is a U-shaped member.

2. The shutoff valve system as defined in claim 1, wherein when power to the electromagnet is disconnected, a spring moves the linearly movable pin away from a position corresponding to an open position of the swing plate that allows flow into the safety valve.

3. The shutoff valve system as defined in claim 1, wherein the linearly movable member is moved towards the electromagnet and towards the swing plate to open the safety valve.

4. The shutoff valve system as defined in claim 1, wherein the linearly movable pin is separately formed from the linearly movable member.

5. A remotely operated shutoff valve system, comprising:
a safety valve for selectively terminating flow through the safety valve, the safety valve including an electromagnet for holding the safety valve open, and a swing plate for closing the safety valve while providing a low restriction to fluid flow when the safety valve is open;
an electrical power supply for powering the electromagnet;
a shutdown switch;
an electrical conductor extending between the shutdown switch, the power supply, and the electromagnet, the electrical conductor including an electrical connector spaced along the electrical conductor, and a flow line between a towing vehicle and a towed vehicle being separable during a separation of the towing vehicle from the towed vehicle, the safety valve being positioned along the flow line;
a pin that is movable to engage the swing plate to move the swing plate from a closed position preventing flow into the safety valve to an open position to hold the safety valve open, wherein the pin is held in engagement with the swing plate in the open position via the electromagnet; and
the safety valve automatically closing in response to one of activation of the shutdown switch or the loss of electrical power to the electromagnet,
wherein the safety valve includes a linearly movable U-shaped member, such that the electromagnet is adjacent one end of the U-shaped member and the pin, being linearly movable to a position corresponding to the open position of the swing plate for holding the swing plate open, is adjacent the other end of the U-shaped member.

6. The shutoff valve system as defined in claim 5, wherein when power to the electromagnet is disconnected, a spring moves the swing plate to the closed position that prevents flow into the safety valve.

7. The shutoff valve system as defined in claim 5, wherein the U-shaped member comprises a manual actuation member to open the swing plate.

8. The shutoff valve system as defined in claim 5, wherein a solenoid includes the electromagnet.

9. The shutoff valve system as defined in claim 5, wherein the linearly movable pin has a centerline disposed substantially perpendicular to a pivot axis of the swing plate.

10. A remotely operated shutoff valve system, comprising:
a safety valve for selectively terminating flow through the safety valve, the safety valve including an electromagnet for holding the safety valve open, and a swing plate for closing the safety valve while providing a low restriction to fluid flow when the safety valve is open;
an electrical power supply for powering the electromagnet;
a shutdown switch;
an electrical conductor extending between the shutdown switch, the power supply, and the electromagnet, the electrical conductor including an electrical connector spaced along the electrical conductor, and a flow line between a towing vehicle and a towed vehicle being separable during a separation of the towing vehicle from the towed vehicle, the safety valve being positioned along the flow line; and
the safety valve automatically closing in response to one of activation of the shutdown switch or the loss of electrical power to the electromagnet,
wherein the safety valve includes a linearly movable actuator, and wherein the linearly movable actuator is moved from a default position to a secondary position towards the electromagnet and towards the swing plate to open the safety valve, and wherein the linearly movable actuator is held in the secondary position via the electromagnet.

11. The shutoff valve system as defined in claim 10, wherein a solenoid includes the electromagnet.

12. The shutoff valve system as defined in claim 10, wherein when power to the electromagnet is disconnected, a spring moves the swing plate to a closed position that prevents flow into the safety valve.

13. The shutoff valve system as defined in claim 10, wherein the linearly movable actuator is manually movable to effect movement of the swing plate to an open position that allows flow into the safety valve.

14. The shutoff valve system as defined in claim 13, wherein the linearly movable actuator is U-shaped.

15. The shutoff valve system as defined in claim 13, wherein the linearly movable actuator includes an arcuate handle portion for being manually moved by an operator.

16. The shutoff valve system as defined in claim 10, wherein the safety valve includes a valve body centerline extending between a valve body inlet port and a valve body outlet port, and wherein the swing plate has a pivot axis disposed substantially perpendicular to the valve body centerline.

17. The shutoff valve system as defined in claim 10, in combination with the towed vehicle and the towing vehicle, wherein the electrical connector is disposed between the towed vehicle and the towing vehicle, and wherein separation of the electrical connector from at least one of the towed vehicle or the towing vehicle prevents the electrical power supply from powering the electromagnet causing loss of electrical power to the electromagnet and closing of the safety valve.

18. The shutoff valve system as defined in claim 10, wherein the linearly movable actuator has at least a portion thereof externally accessible for being pushed by an operator to bring the linearly movable actuator towards the electromagnet to the secondary position for effecting electromagnetic engagement between the electromagnet and the linearly movable actuator, such that the electromagnet can hold the linearly movable actuator in the secondary position once the linearly movable actuator is no longer being manually pushed.

19. The shutoff valve system as defined in claim 10, wherein the linearly movable actuator includes a linearly movable pin and a linearly movable actuation member, the linearly movable actuation member being manually pushable to effect electromagnetic engagement of the linearly movable actuation member with the electromagnet and to effect movement of the linearly movable pin into engagement with the swing plate, thereby opening the safety valve.

20. The shutoff valve system as defined in claim 19, wherein the linearly movable pin is separately formed from the linearly movable actuation member.

* * * * *